June 2, 1959 G. F. ROGERS 2,889,400

STRONG SIGNAL LOCK-OUT PREVENTION

Filed May 13, 1955

INVENTOR.
Gordon F. Rogers
BY
[signature]
ATTORNEY

United States Patent Office 2,889,400
Patented June 2, 1959

2,889,400

STRONG SIGNAL LOCK-OUT PREVENTION

Gordon Fox Rogers, Lincolnwood, Ill., assignor to Radio Corporation of America, a corporation of Delaware Application May 13, 1955, Serial No. 508,177
10 Claims. (Cl. 178—7.3)

Figures 1, 2:
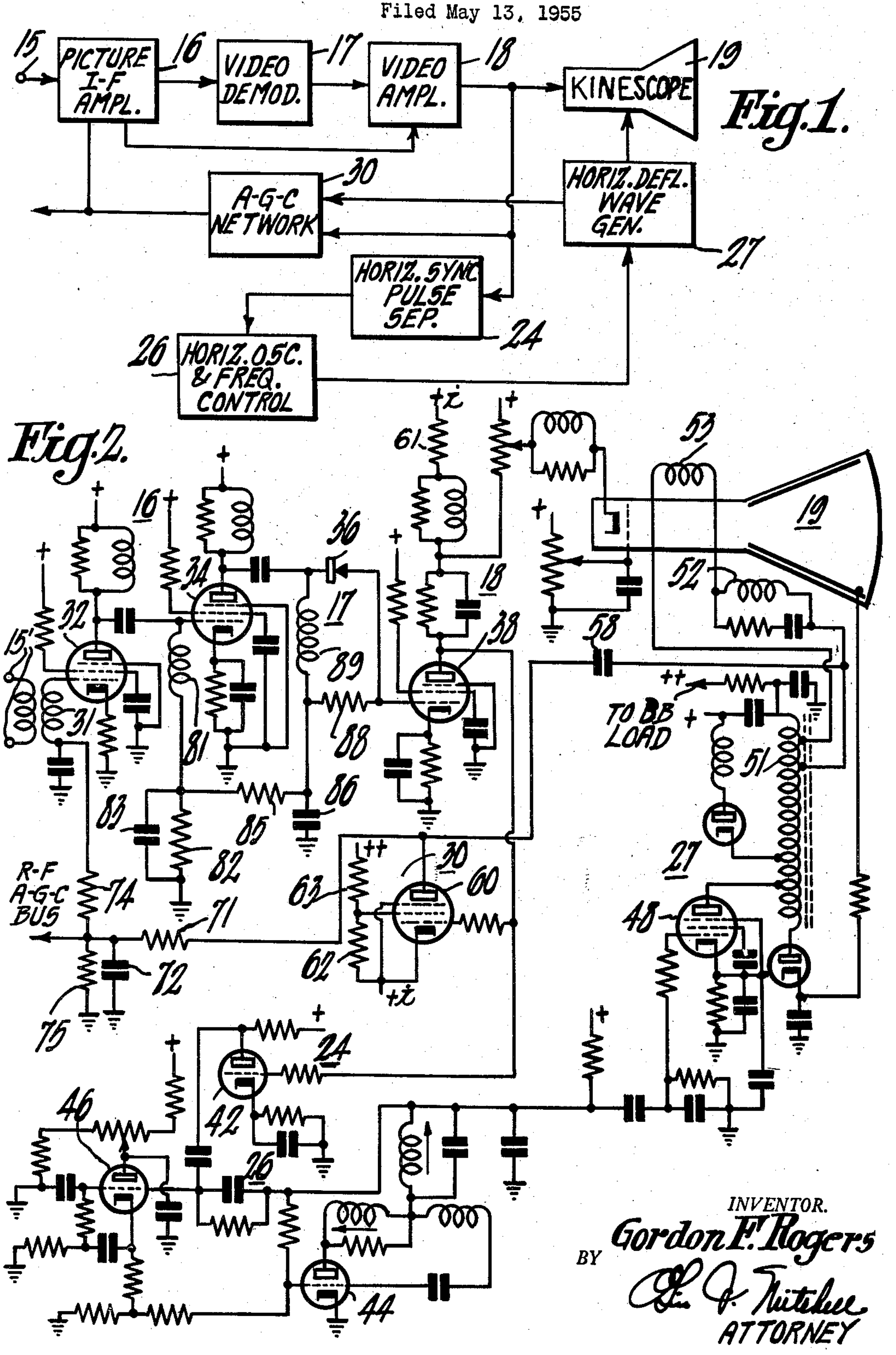

The invention relates to keyed or gated automatic gain control (A.-G.-C.) circuitry for television receivers. It particularly pertains to circuitry for preventing "lock-out" due to overloading of the final intermediate frequency amplifying tube on strong signals. As employed hereinafter the term "lock-out" is construed to indicate operation of a television receiver under the undesirable one of a plurality of possible quasi-stable operating conditions.

Automatic control of the gain of the radio frequency (R.-F.) and intermediate frequency (I.-F.) amplifying circuits in a television receiver is highly desirable. With automatic gain control the overall amplification of the signal is automatically reduced with increasing signal strength to apply a relatively constant level input signal to the video demodulating circuit, even though the signal strength may vary over a wide range. A.-G.-C. overcomes the deleterious effects of differing signal strengths when tuning from one station to another, eliminates the effects of slowly varying heater and anode energizing potentials which tend to alter the gain of the picture I.-F. amplifying circuits, and in addition, eliminates variations caused by moving objects near the antenna system or other moving objects nearby, such as airplanes. Because the direct component (D.C.) is transmitted, the average carrier level of the television picture signal is not constant and it is desirable that the A.-G.-C. circuit be made to respond to the peak level in order to indicate signal strength. Since deflection synchronizing pulses occupy a relatively small portion of the signal, improved noise immunity of the A.-G.-C. circuit may be obtained by making the A.-G.-C. circuit sensitive to the incoming signal only about the time the synchronizing pulses should appear. Keyed or gated A.-G.-C. circuitry was developed for this purpose. In one such circuit arrangement the anode conduction of an A.-G.-C. tube is controlled by gating pulses generated during the retrace portions of the horizontal line-scanning wave so that the anode conduction is proportional to the video signal only during those time portions. As a result the A.-G.-C. rectifier output is distorted less by noise because the gated A.-G.-C. circuit is sensitive only to noise coincident with the synchronizing pulses, and the basic noise immunity is increased by approximately the reciprocal of the duty factor of the gating pulse. In addition, the A.-G.-C. action can be made relatively fast because the increased width of the vertical synchronizing pulses is not measured by the keyed or gated rectifier. Particularly with the increasing use of higher effective radiating power by television (TV) broadcast stations, a TV receiver having a gated A.-G.-C. circuit has the undesirable tendency to "lock-out" when changing from weak to strong stations or when tuned to a strong station the receiver is initially turned on.

In a television receiver receiving strong signals, there ars usually two quasi-stable states of operation, one of which is the desired normal state and the other of which, the "locked-out" state, is not. In the latter state the tube in the final I.-F. amplifying stage is so overloaded that the output signal from the video demodulator is considerably less than normal during the horizontal synchronizing and blanking time interval. Under such conditions the anode current of the video amplifying tube is not sufficiently reduced to cause anode conduction of the A.-G.-C. tube and no A.-G.-C. bias voltage is produced to bring the final I.-F. amplifying tube out of the overloaded condition. In this state the receiver usually falls out of horizontal synchronization and gating pulses are more often than not generated during the video information portion of the cycle so that very little A.-G.-C. voltage is developed. Even if the A.-G.-C. bus has some A.-G.-C. potential due to the grid circuit rectification in the I.-F. amplifying stages preceding the final stage, there generally is insufficient A.-G.-C. bias to reduce the signal to bring the final I.-F. amplifying tube out of the overloaded state in order to resume normal operation.

In the normal state of operation, the input to the final I.-F. amplifying stage is maintained below the level at which overloading of the final I.-F. amplifying tube occurs. The horizontal synchronizing and blanking pulse level is sufficient to drive the video amplifying stage sufficiently close to cut-off that the proper A.-G.-C. voltage is developed and normal operation of the receiver is maintained.

An object of the invention is to automatically restore the operation of a television receiver to the normal state upon lock-out due to strong signal reception.

Another object of the invention is to provide an A.-G.-C. voltage under all signal conditions including strong signal conditions of sufficient magnitude to prevent the deflection circuitry of the television receiver from being "locked-out" of synchronism with the received synchronizing pulses.

A further object of the invention is to provide improved keyed A.-G.-C. circuitry for television receivers which will insure the production of A.-G.-C. voltage under extremely strong signal conditions.

According to the invention "lock-out" due to overloading of the final I.-F. amplifying stage effecting signal inversion at the input to the video amplifying stage is prevented from blocking the A.-G.-C. voltage generating circuit when keyed and eliminating A.-G.-C. voltage almost entirely by developing a potential in response to grid current flow in an electron discharge system in the final I.-F. amplifying stage under the overloaded condition and adding this potential algebraically to the video frequency demodulator output potential applied to the grid of the video amplifying electron discharge structure to bias the latter so that the anode current will be reduced to a level at which the A.-G.-C. tube will conduct to develop an A.-G.-C. voltage which is applied to the preceding amplifier stages of the television receiver in the proper sense to get the final I.-F. amplifying stage out of overload and restore normal A.-G.-C. operation.

A practical arrangement according to the invention is obtained by interposing a suitable bypassed resistor in the grid circuit of the final I.-F. amplifying electron discharge system and the negative voltage derived when the final I.-F. discharge system is overloaded is applied through a simple filter network to the normally grounded side of the video demodulating circuit.

In order that the practical aspects may be more fully appreciated and the invention readily put to use, an embodiment thereof, given by way of example only, will be described with reference to the accompanying drawing forming a part of the specification and in which:

Fig. 1 is a functional diagram of portions of a television receiver to which the A.-G.-C. circuitry according to the invention may be applied; and Fig. 2 is a schematic diagram of an example of circuitry according to the invention.

Referring to Fig. 1 there is shown a functional diagram of a television receiver to which lock-out prevention circuitry according to the invention is readily applicable. Such a television receiver, for example, will otherwise comprise circuits which may be entirely conventional and which will be described to illustrate the setting of the invention. In such a receiver television signals appearing at an antenna are applied to a radio frequency wave amplifying circuit and the output therefrom is applied along with a wave obtained from a local beat oscillation generating circuit to a frequency changing circuit. The output of the frequency changing circuit is applied at input terminals 15 to a picture I.-F. amplifying circuit 16, which may be an individual picture I.-F. amplifying circuit or one amplifying both picture and sound I.-F. signals. A demodulating circuit 17 is coupled to the picture I.-F. amplifying circuit 16, for deriving a video wave from the television signals. The detected video signals are amplified in a video frequency amplifying circuit 18 and thereafter applied to the input circuit of an image reproducing device, or kinescope 19. Sound signals are derived from the frequency changing circuit, or from the I.-F. amplifying circuit 16, or from the demodulating circuit 17, for further processing in a sound I.-F. amplifying circuit, an aural signal discriminating circuit, an audio frequency amplifying circuit and a transducer, usually in the form of a speaker. The output of the video amplifying circuit is also applied either to a combined horizontal and vertical synchronizing pulse separating circuit, or as shown to an individual horizontal synchronizing pulse separating circuit 24 and a vertical pulse separating circuit, to separate the synchronizing pulses from the video information and to separate the vertical synchronizing pulses from the horizontal. The separated vertical synchronizing pulses are applied to a vertical deflection wave generating circuit and the horizontal synchronizing pulses are applied to a horizontal oscillator and frequency controlling circuit 26 connected to a deflection frequency wave generating circuit 27. A high voltage generating circuit may be coupled to the horizontal deflection wave generating circuit 27, and the vertical deflection generating circuit, the horizontal deflection wave generating circuit 27, and high voltage generating circuit are coupled to the kinescope 19 to furnish the necessary vertical and horizontal deflection waves and ultor potential. A low voltage power supply usually connected to the local alternating current (A.-C.) power lines is arranged to furnish direct energizing potentials to all circuits. A gated or keyed automatic gain control A.-G.-C. voltage generating and distributing network 30 is coupled to the video frequency demodulating circuit or, as shown, to the video frequency amplifying circuit 18 and the horizontal deflection wave generating circuit 27 to supply A.-G.-C. voltage to the picture I.-F. amplifying circuit 16 and others of the circuits previously mentioned as desired. Usually the R.-F. circuits are also at least so supplied.

With the prior art arrangements of this type there may be an insufficient amount of synchronizing pulse voltage available to maintain synchronism between the vertical and horizontal deflection wave oscillators and the received synchronizing pulse trains due to high signal level overloading of the final I.-F. amplifying stage and there may not be any synchronizing pulse at all due to inversion of the composite video signal as it would appear at the input of the video amplifying stage so that no A.-G.-C. voltage would be generated to get the final I.-F. amplifying stage out of the overloaded condition. Hence, the receiver would be "locked-out."

According to the invention the A.-G.-C. generating and distributing network 30 may be entirely conventional to produce an A.-G.-C. voltage varying with changing synchronizing pulse signal strength and the A.-G.-C. circuit 30 is gated or keyed by the retrace portion of the horizontal deflection wave obtained from the generator 27 so that the A.-G.-C. voltage generating portion is not adversely affected by noise and the like. In order to insure the development of this A.-G.-C. voltage at all times, even under strong signal conditions, the final amplifying stage of the circuit 16 is arranged to establish voltage which is a function of the overload in the final amplifying device and this voltage is applied to the video amplifier 18 to bias the same to maintain normal development of the A.-G.-C. voltage.

An example of circuitry for performing the functions outlined in the diagram of Fig. 1 is shown in Fig. 2. A composite video modulated I.-F. electric wave is applied to the input terminals 15' connected to the primary of an intermediate frequency transformer having a secondary winding 31 connected to the input electrode of an electron discharge system, shown as the grid of a pentode amplifier tube 32. The output of the amplifier tube 32 is applied to the control grid of a final I.-F. amplifying electron discharge system, shown as a pentode amplifier tube 34, which tube in connection with the pentode amplifier tube 32 forms the last stages of the I.-F. amplifying circuit 16, although it is conceivable that an I.-F. amplifying circuit could have but two stages. The composite video modulated I.-F. wave at the anode of the final I.-F. amplifying tube 34 is demodulated in the demodulating circuit 17 comprising a stage having a crystal demodulator diode 36. The video frequency wave obtained at the output of the demodulating circuit 17 is applied, through conventional trap circuits for separating sound signals for application to the sound I.-F. amplifier, if desired, to the input electrode of an electron discharge structure, shown as the grid of a pentode video frequency amplifier tube 38, of the video frequency amplifying stage 18. The amplified video frequency wave is applied through conventional circuitry between the grid and cathode of a kinescope 19. The amplified video frequency wave at the anode of the video frequency amplifying tube 38 is also applied to the grid of a horizontal synchronizing pulse separating tube 42 in the synchronizing pulse separating circuit 24. Horizontal synchronizing pulses at the anode of the separating tube 42 are applied to the grid of the horizontal oscillator tube 44 and also to the grid of the oscillator control tube 46, which tubes are connected in a known horizontal oscillator frequency control circuit 26. A sawtooth deflection wave developed in the horizontal oscillator portion of the circuit 26 is applied to the control grid of the horizontal amplifier tube 48 of the horizontal deflection wave generating circuit 27. A sawtooth current wave developed across the horizontal output amplifier tube 48 is applied through the intermediary of a transformer 51 to the horizontal deflection coils 52, 53 mounted in a yoke arranged about the neck of the kinescope 19.

The voltage pulse developed across that portion of the winding of the horizontal output transformer 51 which is connected to the horizontal deflection coils 52, 53 is applied to a series circuit comprising a capacitor 58 and an electron discharge device in the form of an A.-G.-C. voltage generating tube 60. The tube 60 has at least a grid, an anode and a cathode. The connections between the anode of the A.-G.-C. voltage generating tube 60 and the transformer 51 are such that during the retrace portion of the deflection wave cycle a positive voltage pulse is applied to the circuit energizing the A.-G.-C. voltage generating tube 60 and causing it to conduct and at the same time storing a charge in the capacitor 58. The amount of charge deposited in the capacitor 58 at each cycle of the horizontal deflection wave is dependent upon the degree of conduction of the A.-G.-C. voltage generating tube 60. This tube is made to conduct in proportion to the synchronizing pulse signal strength of the reecived radio wave by a connection from the grid of the A.-G.-C. voltage generating tube 60 to the anode of the video frequency amplifying tube 38. In this manner the potential across the capacitor 58 is directly proportional to the synchronizing pulse signal strength and the time constants of the circuit are such that charge on the capacitor 58 follows the rise and fall of the synchronizing pulse signal strength. The A.-G.-C. voltage generating tube 60 may be any form of electron discharge device, but preferably is a pentode vacuum tube as shown, since harmful anode-to-grid feed-through is prevented by the use of this type of device. The cathode of the A.-G.-C. voltage generating tube 60 is maintained at the same direct positive energizing potential as applied to the supply terminal of the video amplifying tube resistor 61, which resistor is connected to the low voltage power supply (not shown). A conventional network is coupled to the anode of the A.-G.-C. voltage generating tube 60, and arranged to provide the desired transient response. As shown this network may be constituted by a resistance element 71 and a capacitance element 72 connected between ground and the output terminal of the resistance element 71. The potential across the capacitance element 72, which is negative with respect to ground is the A.-G.-C. voltage which is applied to those R.-F. amplifier circuits connected directly to the output terminal of the filter network. This A.-G.-C. voltage is also applied through the intermediary of a decoupling resistor 74 to the grid of the I.-F. amplifying tube 32 preceding the final I.-F. amplifying tube 34. By means of another decoupling resistor (not shown) which may be interposed between the R.-F. I.-F. bus and the decoupling resistor 74, A.-G.-C. voltage may be applied to other I.-F. amplifying circuits and the like. The A.-G.-C. load resistance is represented by an element resistor 75.

According to the invention, the circuit arrangement of the final I.-F. amplifying stage, which may otherwise be conventional, is arranged with an impedance device, shown as an R.-F. choke 81 and a grid resistor 82, the latter bypassed by a capacitor 83 of suitable value, connected in series between the grid of the final I.-F. amplifying tube 34 and a point of fixed reference potential shown as ground. Under normal conditions substantially no potential drop appears across the resistor 82, but when the final I.-F. stage is overloaded, grid current will be drawn and a potential will appear across the resistor 82 with the terminal remote from ground more negative. By way of a connection, shown as a simple I.-F. filter including a resistor 85 and a capacitor 86, the negative potential is applied through the detector load resistor 88 to the grid of the video amplifier tube 38 to add negative bias in series with the detected signal appearing across the load resistor 88. This negative voltage will bias the video amplifier tube 38 off and A.-G.-C. voltage will still be developed even under signal conditions of such strength as normally to cause signal inversion at the video amplifier tube.

Although it might be expected that some high amplitude noise pulses would cause grid current to be drawn and subsequently adversely affect the video amplifier operation, tests of an embodiment of the invention constructed along the lines shown in Fig. 2 and using the components listed below have shown that no serious change in video amplifier output took place and positive insurance against lock-out is afforded by the application of the invention to otherwise conventional television receiver circuitry.

| Ref. No. | Component | Type or value |
|---|---|---|
| 32 | Picture I.-F. tube | 6CF6. |
| 34 | do | 6CB6. |
| 36 | Video demodulating diode | 1N34. |
| 38 | Video amplifying tube | 12BY7. |
| 42 | Horizontal synchronizing separator tube | ½ 12AU7. |
| 44, 46 | Horizontal oscillator and control tubes | 6SN7GT. |
| 48 | Horizontal output amplifying tube | 6BQ6GT. |
| 58 | Storage capacitor | 560 mmf. |
| 60 | A.-G.-C. voltage tube | 6AU6. |
| 62 | Voltage dividing resistor | 5.6 ko. |
| 63 | do | 6.8 ko. |
| 71 | A.-G.-C. filte esistor | 47 ko. |
| 72 | A.-G.-C. filter capacitor | 2 mf. |
| 74 | A.-G.-C. decoupling resistor | 1 ko. |
| 75 | A.-G.-C. load resistance | 100 ko. |
| 81 | Grid R.-F. choke | 10 uh. |
| 82 | Bias developing resistor | 5.6 ko. |
| 83 | Bypass capacitor | 10 mf. |
| 85 | Filter resistor | 1.5 ko. |
| 86 | Filter capacitor | 0.005 mf. |
| 88 | Detector load resistor | 3.3 ko. |
| 89 | Detector R.-F. choke | 10 uh. |

Lock-out caused by overloading the final amplifier stage with the grid resistor 82 short circuited was immediately overcome when the short circuit was removed. The power supply used with the circuit arrangement delivered 265 volts between the points marked with the plus (+) sign and the points marked with the ground symbol and the circuit developed approximately 400 volts between the so-called "Boosted B" supply terminal marked with the double plus (++) sign and the points marked with the ground symbol. Other component parts and potential values may be determined by those skilled in the art for applications of the invention to other conventional television receivers.

The invention claimed is:

1. In a television receiver including an intermediate frequency amplifying stage having an input circuit to which an electric wave of amplitude sufficient to overload said stage may be applied and having an output circuit, a video demodulating stage coupled to the output circuit of said amplifying stage and a video frequency amplifying stage coupled to said demodulating stage, means interposed in said input circuit of said intermediate frequency amplifying stage to produce a voltage indicative of overloading, and means to apply said voltage to said video frequency amplifying stage to reduce the effect of said overloading.

2. In a television receiver including an intermediate frequency amplifying stage to which an electric wave of amplitude sufficient to overload said stage may be applied, said stage comprising an electron discharge system having an input circuit comprising grid and cathode electrodes and an output circuit, a video demodulating stage coupled to the output circuit of said electron discharge system and having an output circuit, a video frequency amplifying stage comprising an electron discharge structure having an input circuit including a grid and a cathode, means interposed in the input circuit of said electron discharge system to produce a potential in response to current flow in said grid electrode due to said overloading of said intermediate frequency amplifying stage, and means to apply said potential to the input circuit of said electron discharge structure to bias the same to overcome the effect of said overloading of said intermediate frequency amplifying stage.

3. A television receiver including an intermediate frequency amplifying stage comprising an electron discharge system having cathode, grid and anode electrodes, means connecting said cathode electrode to a point of fixed reference potential, means to apply an electric wave modulated by a television signal between said grid and said cathode electrodes, a radio frequency choke and a resistor connected in series between said grid electrode and said point of fixed reference potential, a demodulating stage coupled between said cathode and anode electrodes and having a load resistor across which the demodulated television signal appears, a demodulated signal amplifying stage comprising an electron discharge structure having a cathode connected to said point of reference potential, a grid connected to one terminal of said load resistor and an anode, and a connection between said junction of said series connected choke and resistor and the other terminal of said load resistor.

4. A television receiver including an intermediate frequency amplifying stage comprising an electron discharge system having cathode, grid and anode electrodes, means connecting said cathode electrode to a point of fixed reference potential, means to apply an electric wave modulated by a television signal between said grid and said cathode electrodes, a radio frequency choke and a resistor connected in series between said grid electrode and said point of fixed reference potential, a capacitor shunting said resistor, a demodulating stage coupled between said cathode and anode electrodes and having a load resistor across which the demodulated signal appears, a demodulated signal amplifying stage comprising an electron discharge structure having a cathode connected to said load resistor and an anode, and a filter comprising a shunt capacitor and a series resistor connected between said junction of said series connected choke and resistor and the other terminal of said load resistor.

5. A television receiving circuit arrangement including an amplifying circuit to which a video modulated wave of varying amplitude proportional to signal strength is applied, said amplifying circuit comprising an electron discharge system having a cathode and a grid, a video demodulating circuit coupled to said amplifying circuit to derive the video wave from the video modulated wave, a video amplifying circuit coupled to said video demodulating circuit, said video amplifying circuit comprising an electron discharge structure having a cathode and a grid, a synchronizing pulse separating circuit coupled to said video amplifying circuit, a deflection wave generating circuit coupled to said separating circuit to generate a deflection wave having trace and retrace portions synchronized with the synchronizing pulses derived by said separating circuit, an electron discharge device having a grid electrode, an anode electrode and a cathode electrode, means including a capacitive reactance element coupling said anode and said cathode electrodes to said deflection wave generating circuit to energize said electron discharge device during said retrace portions of said deflection wave, means connecting said grid and cathode electrodes to said video amplifying circuit, a filter network having a series resistance element connected between said capacitive reactance element and said amplifying circuit and a shunt capacitance element, a radio frequency choke and a resistor connected in series between the grid of said electron discharge system and a point of fixed reference potential, a capacitor shunting said resistor, a series resistor having one terminal connected to the junction between said radio frequency choke and said resistor, a capacitor connected between the other terminal of said series resistor and said point of reference potential, and a resistor connected between the other terminal of said series resistor and the grid of said electron discharge structure.

6. In a television receiver, the combination comprising an intermediate frequency amplifier adapted for automatic gain control in response to a gain control potential, said intermediate frequency amplifier including an amplifying stage having an input circuit and an output circuit, said stage subject to overloading by signals applied to said input circuit which exceed a certain level as evidenced by direct-current flow in said input circuit, said input circuit including impedance means connected to develop a control voltage in response to said direct current, circuit means for developing an automatic gain control potential normally having a magnitude related to the strength of said signals except during overloaded condition of said intermediate frequency amplifying stage, means coupling said circuit means with said output circuit of said amplifying stage, means for applying said automatic gain control potential to said intermediate frequency amplifier for controlling the gain thereof inversely with the strength of said signals, and means for applying said control voltage to said coupling means in a manner to condition said circuit means to produce an automatic gain control voltage of a magnitude tending to decrease the gain of said intermediate frequency amplifier.

7. In a television receiver, the combination comprising an intermediate frequency amplifier adapted for gain control in response to a gain control potential, said intermediate frequency amplifier including an intermediate frequency amplifying stage having an input circuit and an output circuit, said input circuit including impedance means connected to develop a control voltage in response to signals of sufficient amplitude to overload said intermediate frequency amplifying stage, a second amplifying stage coupled to said output circuit, means coupled to said second amplifying stage for developing an automatic gain control potential normally having a magnitude related to the strength of said signals, means for applying said automatic gain control potential to said intermediate frequency amplifier for controlling the gain thereof inversely with the strength of said signals, and means for applying said control voltage to said second amplifying stage in a manner to condition said automatic gain control potential developing means to produce a control voltage for reducing the gain of said intermediate frequency amplifier.

8. In a television receiver for receiving a television carrier wave modulated by a composite television signal including recurrent synchronizing pulse components, the combination comprising an intermediate frequency amplifier adapted for gain control in response to a gain control potential, said intermediate frequency amplifier including an intermediate frequency amplifying stage having an input circuit and an output circuit, said input circuit including impedance means connected to develop a control voltage in response to signals of sufficient amplitude to overload said intermediate frequency amplifying stage, a video demodulating stage coupled to the output circuit of said amplifying stage, a video frequency amplifying stage coupled to said demodulating stage, means coupled to said video frequency amplifying stage for developing an automatic gain control potential normally having a magnitude related to the signal amplitude of said recurrent synchronizing pulse components except during overloaded condition of said intermediate frequency amplifying stage whereupon the amplitude of said synchronizing pulse components is reduced, means for applying said automatic gain control potential to said intermediate frequency amplifier for controlling the gain thereof inversely with the strength of said signals, and means for applying said control voltage to said video amplifying stage in a manner to condition said automatic gain control potential developing means to produce a control voltage for reducing the gain of said intermediate frequency amplifier during an overloaded condition of said intermediate frequency amplifying stage.

9. In a television receiver for receiving composite television signals including recurrent synchronizing pulse components, an intermediate frequency amplifier adapted for automatic gain control and having a gain control potential terminal, an intermediate frequency amplifying stage in said intermediate frequency amplifier including an electron discharge device having an anode, control electrode and cathode, means providing an input circuit for said television signals connected between said control electrode and said cathode and including a resistor for developing a control voltage in response to control electrode current, means providing a signal output circuit connected between said anode and said cathode for deriving said composite television signals in amplified form, a second amplifying stage coupled to said output circuit for amplifying said composite television signal, means coupled to said second amplifying stage for deriving an automatic gain control potential normally having a magnitude related to the strength of the received television signal, means for applying said automatic gain potential to said terminal for controlling the gain of said intermediate frequency amplifier inversely with the strength of said received television signals, and means for applying said control voltage to said second amplifying stage in a manner to condition said automatic gain control means to produce a control voltage for reducing the gain of said intermediate frequency amplifier.

10. In a television receiver for receiving composite television signals including a recurrent synchronizing pulse component, an intermediate frequency amplifier adapted for automatic gain control and having a gain control potential terminal, an amplifying stage in said intermediate frequency amplifier including an electron discharge device having an anode, control electrode and cathode, means providing an input circuit for said television signals connected between said control electrode and said cathode and including a resistor for developing a control voltage in response to control electrode current caused by signals of sufficient amplitude to overload said amplifying stage, means providing a signal output circuit connected between said anode and said cathode for deriving in amplified form said composite television signal including recurrent synchronizing pulse component except during an overloaded condition of said amplifying stage wherein the reproduction of said recurrent synchronizing pulse component is deleteriously affected, a video demodulating stage coupled to said output circuit, a video frequency amplifying stage coupled to said demodulating stage for amplifying the demodulated composite television signal, means coupled to said video frequency amplifying stage for deriving an automatic gain control potential normally having a magnitude related to the amplitude of the synchronizing components of said composite television signal except during said overloaded conditions of said intermediate frequency amplifying stage, means for applying said automatic gain potential to said terminal for controlling the gain of said intermediate frequency amplifier inversely with the strength of said signals, and means for applying said control voltage to said video frequency amplifying stage to control the gain thereof in a manner to condition said automatic gain control means to produce a control voltage for reducing the gain of said intermediate frequency amplifier.

References Cited in the file of this patent

UNITED STATES PATENTS 2,698,358 Hoyt ---------------- Dec. 28, 1954